United States Patent [19]

Hogg et al.

[11] Patent Number: 5,237,630
[45] Date of Patent: Aug. 17, 1993

[54] FIBER OPTIC DEVICE WITH REFLECTOR LOCATED AT SPLICE JOINT

[76] Inventors: Dayle W. Hogg, 91 Heman St. Apt. 5, Toronto; Tomas Valis, 10 Muirhead Rd. Apt. 203, Willowdale; Raymond M. Measures, 16 Flowovale Rd,, Tromhill, all of Ontario, Canada

[21] Appl. No.: 763,444

[22] Filed: Sep. 20, 1991

[51] Int. Cl.[5] ............................................. G02B 6/26
[52] U.S. Cl. ..................................... 385/12; 385/95; 385/96
[58] Field of Search ...................... 385/95, 96, 12, 327

[56] References Cited

U.S. PATENT DOCUMENTS

| H,474 | 6/1988 | Taylor | 350/96.19 |
|---|---|---|---|
| 4,358,851 | 11/1982 | Scifres et al. | 372/97 |
| 4,788,436 | 11/1988 | Koechner | 385/12 X |
| 4,848,999 | 7/1989 | Taylor | 65/4.3 |
| 4,892,388 | 1/1990 | Taylor | 350/320 |
| 4,920,261 | 4/1990 | Bock et al. | 385/12 X |
| 4,923,273 | 5/1990 | Taylor | 385/48 |

OTHER PUBLICATIONS

"Fiber Optic Fabry. Perot Strain Gauge", Valis et al. IEEE Photonics Tech. Letters vol. 2 No. 3 Mar. 1990.
"Fiber Optic Sensor Research at Texas A&M Univ." Lee et al. SPIE Conference SPIE vol. 1170, 1989.
"Reflectively Tapped . . . Filters", Lee et al. Electronic Letters vol. 23 No. 11 pp. 596-598 May 21, 1987.
"Interferometric Sensors . . . Mirrors", Proceedings of Optical Fiber Sensors Ofs '88, 1988.
"Interferometric Optical . . . Mirrors", Electronics Letters, vol. 24, No. 4, pp. 193-194, Feb. 18, 1988.
"Pigtailed High-Finesse . . . Ranges", Electronics Letters, vol. 23, No. 15, pp. 781-783 Jul. 16, 1987.
"Multiplexed . . . Sensor", Fiber Optic and Laser Sensors VII, SPIE vol. 1169 pp. 172-176, 1989.
"Novel Optical . . . Detector", Electronics Letters, vol. 20, No. 1, pp. 53-54, Jan. 5, 1984.
"High Speed . . . Interferometers", Farahi et al., Fiber Optic and Laser Sensors vol. SPIE vol. 838 pp. 216-222, 1987.
"Reduction . . . Optic Sensors", Newson et al., Applied Optics, vol. 28, No. 19 pp. 4210-4215, Oct. 1, 1989.
"Optical . . . Sensors", In Proceedings Fiber Optic and Laser Sensors v, SPIE vol. 838, pp. 231-237, 1987.
"Multiplexed . . . Sensor", Mums, Fiber Optic and Laser Sensors VII, SPIE vol. 1169, pp. 172-176, 1989.
"Embedded . . . Load", Albrecht et al., Proceedings of Conference on Optical Fiber Sensor-Based Smart Materials and Structures, Edited by Ro Claus pp. 124-132 Apr. 3-4, 1991.

Primary Examiner—John D. Lee
Assistant Examiner—S. W. Barns
Attorney, Agent, or Firm—Thomas A. O'Rourke

[57] ABSTRACT

Disclosed herein is an optical fiber device comprising an optical fiber; the fiber having a first portion with an endface, the endface having a core and a peripheral area around the core, the endface having defined thereon a first region adjacent the core and a second region adjacent the peripheral area; a layer of reflective material located on the endface and confined to the first region, thereby forming a localized reflector thereon.

22 Claims, 9 Drawing Sheets

FIBER OPTIC DEVICE WITH REFLECTOR LOCATED AT SPLICE JOINT

The present invention relates to fiber-optic sensors and more particularly to methods of their manufacture.

Fiber-optic sensors are popular for use in detecting changes in temperature, pressure and strain. Fiber-optic sensors, in which the fiber itself acts as the transducer, are of interest in the context of advanced composite materials. This is due to the face that the fiber is generally compatible with both thermoset and thermoplastic composites. This makes the fiber-optic sensor particularly useful when embedded in the composite material to function as an 'in situ' measurement device.

One type of fiber-optic sensor is generally known as the Fiber Fabry-Perot sensor (hereinafter referred to a the FFP sensor). As is well known to those in the art, the term 'Fabry-Perot' refers to the use of a first semireflective mirror which is positioned in a light path upstream of a second mirror wherein the second mirror is either fully or semireflective. With this arrangement, an interference pattern is established by the light reflected off the first and second mirrors.

Conventional Fabry-Perot sensors are generally made from a single or multi-mode optical fiber. In some, the core region of the fiber is a glass or plastic material. The core region is formed by doping the central portion of the fiber such that it has a higher index of refraction than the surrounding glass (which is known as the 'cladding'). Thus, light launched down the core of the fiber will be confined to the core, and propagate with little loss. Surrounding the cladding is a buffer which is generally a soft acrylate or polyamide coating which has a lower elastic modulus than the glass fiber in order to provide mechanical strength and protection to the fragile glass fiber.

Thus, the fabrication of an FFP cavity basically involves the formation of a pair of reflective surfaces (usually semireflective) at spaced locations along the fiber. The reflective surfaces are generally formed by a slice (hereinafter referred to as a 'semireflective splice') bordered by media of different refractive indices, for example, glass to doped glass, glass to air, glass to dielectric material, or glass to metal. There are a number of conventional methods to form semireflective splices, including:

i) chemically precipitating silver over the entire fiber endface and fusion splicing the coated end with another end to form a continuous fiber (referred to as the 'Silver' approach);
ii) sputtering titanium oxide over the entire fiber endface and fusion splicing the sputtered end with another end to form a continuous fiber (referred to as the 'Titanium' approach);
iii) forming an air bubble in the core region of a fusion splice (referred to as the 'Air Gap' approach);
iv) holding apart the ends two fibers to form an air gap therebetween and then supporting the fibers by means of a large hollow core fiber (referred to as the 'Hollow Core' approach).

Although these techniques are capable of producing a functional FFP sensor, these conventional techniques have several shortcomings.

For example, both the Air Gap and Hollow Core approaches require an external support structure (which can be in the form of a hollow core fiber) to provide the necessary mechanical strength. This external structure is undesirable for a sensor to be embedded within a composite material.

Using the spaced semireflective mirrors means that the second splice must match the lower reflectively of the first semireflective splice. As a result, an additional length of fiber extending past the sensing region is required. Since both semireflective mirrors have a low reflectivity (typically 4%) the majority of light entering the sensing region propagates through and must be prevented from reflecting back from outside the sensing region. This is usually accomplished by inserting the lead-out fiber endface in index matching fluid or gel, or by fracturing the end of the fiber, all at a greater expense.

One use of the FFP sensor as described herein above is in fiber-optic strain rosettes. Strain rosettes are intended to measure the in-plane strain tensor at a point in a host structure. They may be surface adhered or composite embedded. Two types of fiber-optic strain rosettes have been described previously, using localized polarimeters and Michelson interferometers as explained in:

i) the article entitled 'Structurally Integrated Fiber Optic Strain Rosettes' authored by Dr. Raymond Measures et. al. published in the proceedings: 'Fiber Optics, Smart Structures and Skins', SPIE Vol. 986, pp. 32–42, 1988;
ii) the article entitled 'Localized Fiber Optic Strain Sensor Embedded in Composite Materials' published in the proceedings: 'Fiber Optics, Smart Structures and Skins II', SKIE Vol. 1170,pp. 495–504, 1989;

The former sensor lacks the strain sensitivity required to make measurements with a 3 millimeter gauge length with a 1 microstrain resolution. The latter suffers from the need to maintain common-mode strain-rejection (that is, lead-in/lead-out insensitivity) of four optical fiber leads both inside and outside the composite structure and phase continuity across the connectors.

There remains a need for an improved fiber optical device. It is an object of the present invention to provide just such a device.

Briefly stated, the invention involves, an optical fiber device comprising:
  an optical fiber;
  the fiber having a first portion with an endface, the endface having a core and a peripheral area around the core, the endface having defined thereon a first region adjacent the core and a second region adjacent the peripheral area;
  a layer of reflective material located on the endface and confined to the first region, thereby forming a localized reflector thereon.

In another aspect of the present invention, there is provided a method of making an optical fiber device comprising the steps of:
  providing an first optical fiber portion with a core and a peripheral area around the core;
  forming an endface on the first portion with the core and the peripheral area exposed thereon;
  providing a first region on the endface and adjacent the core and a second region adjacent the peripheral area;
  providing a layer of reflective material on the endface and confining the layer to the first region, thereby to form a localized reflector thereon.

Several preferred embodiments will now be described with reference to the appended drawings in which:

FIG. 8a) to g) are schematic views of successive steps in a photodeposition technique in connection with the fabrication of a localized mirror;

Figure 1:
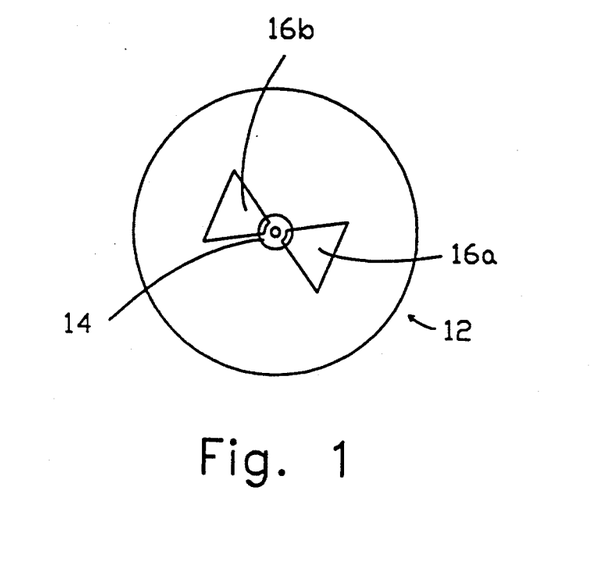
FIG. 1 is a schematic cross sectional view of an optical fiber.
Figure 2:
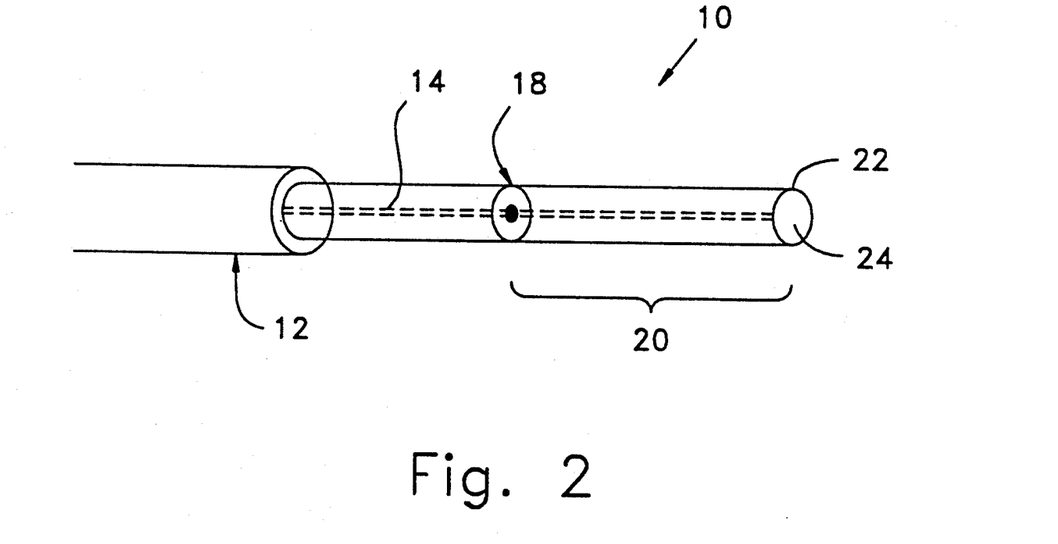
FIG. 2 is a schematic view of an FFP sensor.
Figure 3:
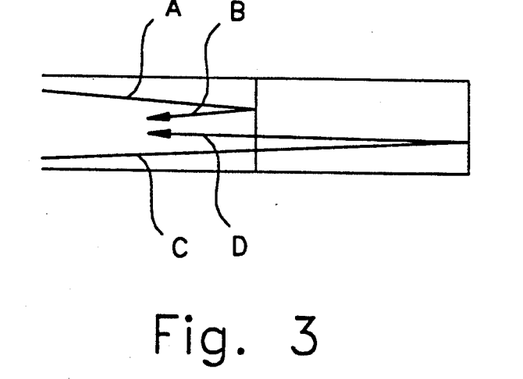
FIG. 3 is a schematic view showing the light path through the fiber in the FFP sensor illustrated in FIG. 2.

Referring to the FIGS. 1 to 3, there is provided a fiber Fabry-Perot (FFP) sensor 10 which makes use of a fiber 12. The fiber 12 is of the type shown in FIG. 1, is commercially available and known to have a core 14 and a peripheral area around the core and integrally formed therewith from dielectric material and what is referred to as a 'bow-tie' configuration. The term 'bow-tie' arises from the use of two stress regions 16a, 16b formed from doping the region outside of the glass core 14. These stress regions set up a stress field across the core 14 which tends to confine the polarization of the launched light to a single polarization mode (or plane) along the length of the core 14.

FIG. 2 illustrates the FFP sensor 10, which has a fiber optic core 14 and a peripheral area surrounding the core. The core 14 has a splice shown at 18 where a semireflective surface is formed on or about the core 14, namely in a first region, to form a semireflective mirror in a manner to be descried. It should be pointed out that the first region is adjacent the core and may or may not have a size precisely equal to the core as will be described. It should also be pointed out that the semireflective mirror is confined to the first region thereby leaving a second region, adjacent the peripheral area of the endface, uncoated. A sensing region 20 is provided down stream of the splice 18 and terminates at a perpendicular endface 22 that is coated with a mirrored layer 24.

In use, monochromatic light is launched down the core 14 of the fiber 12 along path A until it reaches the semireflective mirror where a small portion (in the order of 10 percent) of the incident light is reflected back into the core 14 along path B to form a reference component. The remainder (minus losses) continues through the sensing region 20 along path C, reflects off the endface mirror 22 and returns to the semireflective splice 18 along path D. A portion of the reflected light in path D passes through the semireflective mirror to form a sensing component which interferes with the reference component to produce a sinusoidal intensity modulation (which will be referred to below as 'modulated light') that is a function of strain, pressure and temperature.

Figure 4:
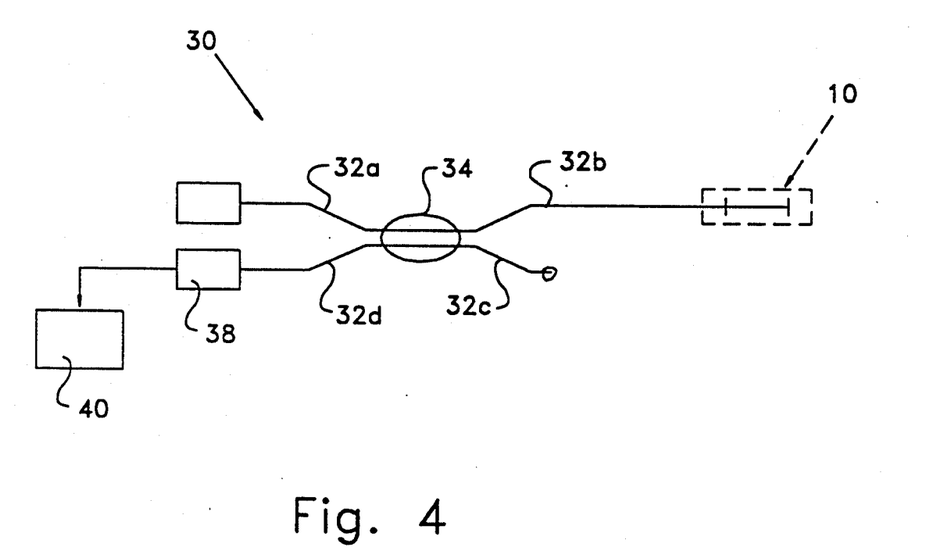
FIG. 4 is a schematic view showing an FFP operating system.

Referring to FIG. 4, an FFP sensor system is shown at 30 which includes a light source in the form of a laser diode is coupled to one end of an optical fiber 32a. At the other end of the fiber 32a is joined to one port of a (50:50) 2×2 coupler 34. The coupler 34 has three other ports, the first of which is joined to one end of an optical fiber 32b. The other end of the optical fiber 32b which is joined to an FFP sensor 10. The third port of the coupler 34 is joined to one end of a fiber 32c which is terminated by an index matching gel. The fourth port of the coupler 34 is joined to one end of an optical fiber 32d the other end of which is joined to a photodetector 38. An appropriate electronics system 40 is coupled to the photodetector 38 to analyze signals carried by the fiber 32d.

All components should be spliced or coupled on axis to maintain a linear State of Polarization throughout the system. This will help to present signal fading.

In use, light from the laser diode is launched along the optical fiber 32a through the coupler 34, and on to the FFP sensor to produce the reference and sensing components. The modulated light then returns through the fiber 32b to the 2×2 coupler 34 which directs a portion of the light to the photodetector 38. The system 40 is then used to interpret the optical signal.

The steps to fabricate an FFP sensor 10 are as follows:

1) The protective buffer layer is removed from the ends of two optical fibers. Enough of the buffer is removed to accommodate the chuck of the fusion splicer to be used and the gauge length desired;

2) Each fiber 12 is cleaved to obtain a flat, perpendicular endface 22;

3) The core 14 of one or both endfaces is coated with a localized reflective layer, that is, localized around the core 14 of the fiber 12 leaving the remainder of the fiber 12 uncoated. This is done by one of a number of techniques as will be described in more detail below;

4) The endfaces are fusion spliced together. This is done by placing both endfaces in an electric arc which softens the glass. Computer controlled micropositioners are then be used to force the two fiber endfaces together. Since only the core 14 of each fiber 12 is coated with the semireflective material, the remainder of the fiber 12 is pristine. This means that the resulting weld is substantially as mechanically strong as the pristine fiber 12. Fusion splicers are commercially available with adjustable arc current and time settings, as well as the positioning of the optical fiber 12;

5) One end of one fiber 12 is cleaved to form a sensing region 20, the length of which is determined by the sensing application, strain and spatial resolution requirements;
6) A reflective layer is deposited on the cleaved end of the fiber 12 to form the endface 22 mirror; and
7) The fused fibers are recoated with a suitable buffer material. For some sensor applications, for example those which involve embedding an FFP sensor in (or attaching an FFP sensor to) a host structure, this coating should be sufficiently thin to couple the FFP sensor with changes in strain and temperature in the host structure.

During the fusion process the peripheral area of one endface is bonded to the peripheral area of the other endface. Whether significant degree of bonding occurs in the core region will depend on the type of material being used to form the semireflective mirror.

It should be borne in mind that when fusing the ends of the fiber 12, the fiber's core and polarization axes must be aligned to ensure that the light will propagate through the sensing region 20 with a substantially constant linear state of polarization (S.O.P.). The stress regions in the fiber 12 define the two polarization axes. These axes must be aligned prior to fusion splicing in order to preserve linear polarization through the semireflective splice 18. This is accomplished by several known methods, including:
 i) monitoring the state of polarization of light propagating through the two fibers 12 prior to fusion splicing;
 ii) visually aligning the stress regions visible at the fiber 12 endface 22; or
 iii) visually aligning the stress regions as viewed perpendicularly through the side of the fiber.

However, the first method cannot be used if the fiber core 14 is coated with a highly reflective layer (on the order of at least 50%) prior to fusion splicing since the coating covers the core 14. The second method is also not possible if the entire endface 22 of the fiber 12 is coated since this technique causes the stress members to be obscured.

Unlike prior FFP sensors, the present technique allows the mechanical strength and optical characteristics to be optimized independently by controlling:

a) Fusion splice 18 current, time and force settings

Prior techniques as indicated all require a reduction in the fusion splicing arc current and duration, to achieve a semireflective splice. This technique allows for the introduction of a reflective surface which, if coated over the entire endface of the fiber, would no form an adequate bond between the two fibers. However, by localizing the mirror to the first region, the remaining fiber endface in the second region can be responsible for the mechanical strength of the semireflective splice.

Thus the fusion splicing parameters as applied by the fusion splicer manufacturer for standard optical fiber splicing, can be used to ensure optimal mechanical strength. The characteristics of the reflective surface can then be chosen to obtain the desired reflectivity and wavelength response without simultaneously affecting the mechanical strength of the semireflective splice.

The strength of the 'semireflective' splice may be optimized by maximizing the glass to glass contact. The core of a single-mode fiber is typically 4 to 10 microns in diameter. Thus the core region comprises only 0.1% to 0.6% of the total cross sectional surface area of an optical fiber (assuming a 125 micron outside diameter). By limiting the mirror to the core region, the vast majority (that is greater than 99%) of the fiber endface is available for fusion splicing. Even a 15 micrometer diameter mirror represents only 1.4% of the endface surface area of the fiber.

b) Characteristics of the material in the semireflective coating

Since the choice of the reflective material has no bearing on the mechanical strength of the semireflective splice, a single layer metallic or dielectric coating, for example, can be chosen where one wishes a wavelength independent, broad band reflector. Multilayer metallic and/or dielectric coatings can be chosen where a narrow band, wavelength dependent reflector is desired.

At the semireflective splice 18, and the endface 22 mirror, three parameters describe the optical quality of the mirror.
 R—reflectance
 T—transmittance
 L—loss,
where $R+T+L=1$. This is referred to as the 'relevant power budget'.

Figure 5:
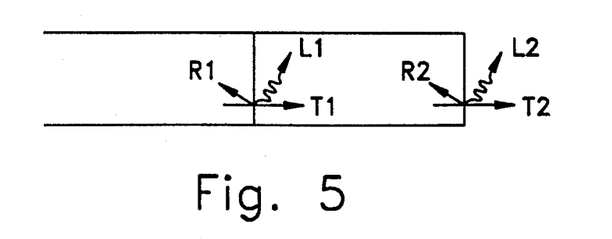
FIG. 5 is a schematic view showing the 'relevant power budget' for the FFP sensor illustrated in FIG. 2.
Figure 5A:
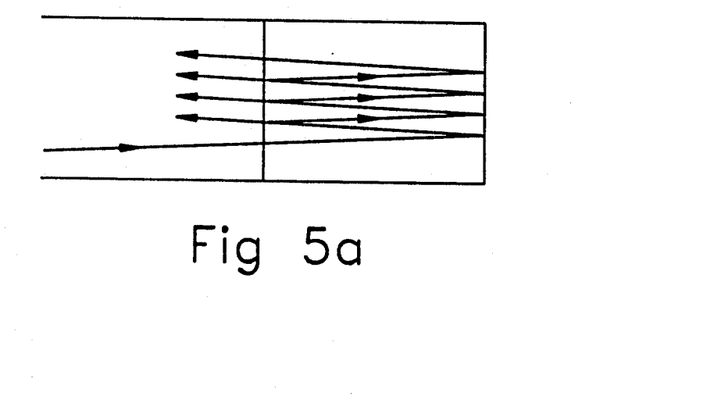
FIG. 5A is a schematic view showing multiple reflections in a fiber.

FIG. 5 illustrates the cavity and helps in discussing the relevant power budget. Experimental evidence has shown that multiple reflections within the cavity can be ignored for high loss semireflective mirrors. In order to maximize the power budget of the sensor 10, the reference and sensing components must be equal in power and as large as possible. For one specific example of an FFP sensor 10, following optical properties may be typical: $R2=95\%$ $L2=5\%$ $T2=0\%$; while $L1$ (loss at the semireflective splice) can be as high as 80%. These high losses permit the use of a fully reflective mirror and ensure a single reflection at the fully reflective mirror rather than multiple reflections typical of a high finesse application, as for example shown in dashed lines in FIG. 5a. This single reflection is made possible by the fact that a sufficiently small percentage of the incident light is reflected back from the semireflective mirror into the sensing cavity (in order of 1%). Of course, these properties may vary with the type of FFP sensor 10 being made.

Since the relatively small surface area of this core is not required to contribute to the mechanical strength of the semireflective splice, a relatively thick reflective layer of material can be deposited over the endface.

However the layer (after fusing) should not be excessively thick, that is on the order of 40 microns or more, as this may:
 i) significantly degrade the quality of the semireflective mirror, that is by preventing light from propagating through the mirror to establish the requisite optical interference between the sensing and reference components; and
 ii) significantly reduce the mechanical strength of the splice and require additional extrinsic support as a required, for example with the 'Hollow Core' and 'Air Gap' approaches.

The present technique is significant in that it eliminates the need for additional strength members or secondary fibers with index matched ends.

Deposition of a thin reflective layer can be accomplished by various vacuum deposition techniques (evaporation, sputtering E-gun (Electron beam gun) MBE (Molecular Beam Epitaxy), CVD (Chemical Vapour Deposition) or through other techniques including chemical deposition. Suitable mirror materials include single and multi-layer metals (Ni, Co, Al, Ag, Au, etc), as well as single and multi-layer dielectrics (TiO$_2$, MgF$_2$, etc.). Increased mirror adhesion to the fiber can be achieved by heating the fiber during deposition.

Among others, the localized semireflective mirror may be formed using the following procedures.

1) MECHANICAL MASK

Figure 6:
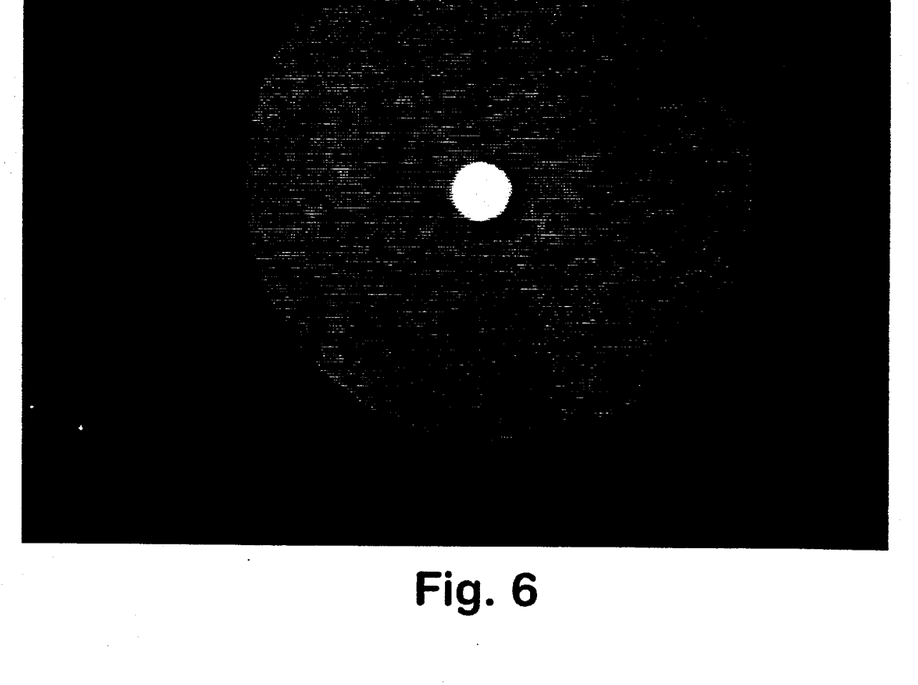
FIG. 6 is a micrograph of a mirror deposited on the endface of a fiber in connection with the FFP sensor illustrated in FIG. 2.

A localized semireflective mirror can be fabricated by depositing a thin reflective film through a mechanical mask or aperture, wherein the dimensions of the mask correspond to the dimensions of the deposited mirror. FIG. 6 is a micrograph of a mirror deposited through a 15 micrometer diameter stainless steel mask.

Figure 7:
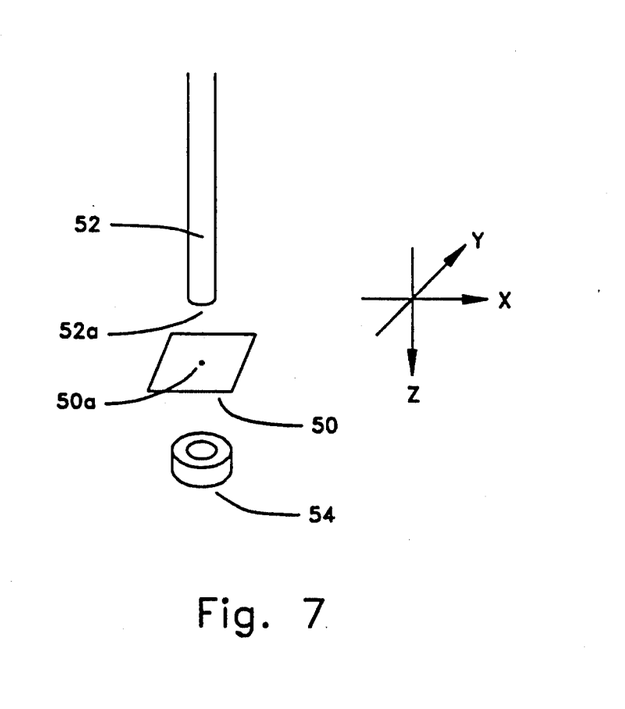
FIG. 7 is a schematic vie of a mechanical mask technique in connection with the fabrication of a localized mirror 2.

As shown in FIG. 7, a mask 50 is butted against the endface 52a of the optical fiber 52. The mask 50 has an opening 50a aligned with the core of the fiber. FIG. 7 illustrates the positioning of the mask prior to butting the fiber against the mask. Alignment of the fiber with the mask is accomplished by launching light down the fiber and detecting the light through the mask by a detector 54 placed directly under the mask. The position of the fiber is then adjusted in the X and Y directions until the light intensity as measured by the photodetector, is maximized. Alignment in the Z direction is accomplished by visually aligning the fiber with a low power stereo microscope. A series of iterations in the X, Y and Z directions are then required to attain optimal alignment of the fiber with the mask.

An alternate approach is to launch light through the aperture and detect the amount of light launched into the adjacent fiber as the adjacent fiber is brought into alignment with the mask. Either of these approaches can be automated with a microcomputer and commercially available motorized micropositioners.

The aperture is usually larger than the core of the fiber. Thus, optical alignment of the fiber with the mask will occur when the fiber core is located anywhere inside the mask and not just when the core is centered over the mask. Therefore, as the diameter of the aperture decreases, the concentricity of the mechanical alignment increases.

Apertures can be fabricated in several ways including the following proposed methods:
1) Drilling a hole with a laser, electron beam or similar device into a material such as stainless steel;
2) Chemically etching a material such as a single crystal silicon wafer;
3) Mechanically punching a hole through a thin membrane;
4) Using a series of four orthogonal moving knife edges or a camera type iris to define mask area.

2) PHOTORESIST MASK

A mask similar to the mechanical masks described above can also be created by coating the end of a fiber with a layer of photoresist material and exposing the photoresist material to light. Two approaches are possible using either a positive or negative photoresist material.

Figure 8:
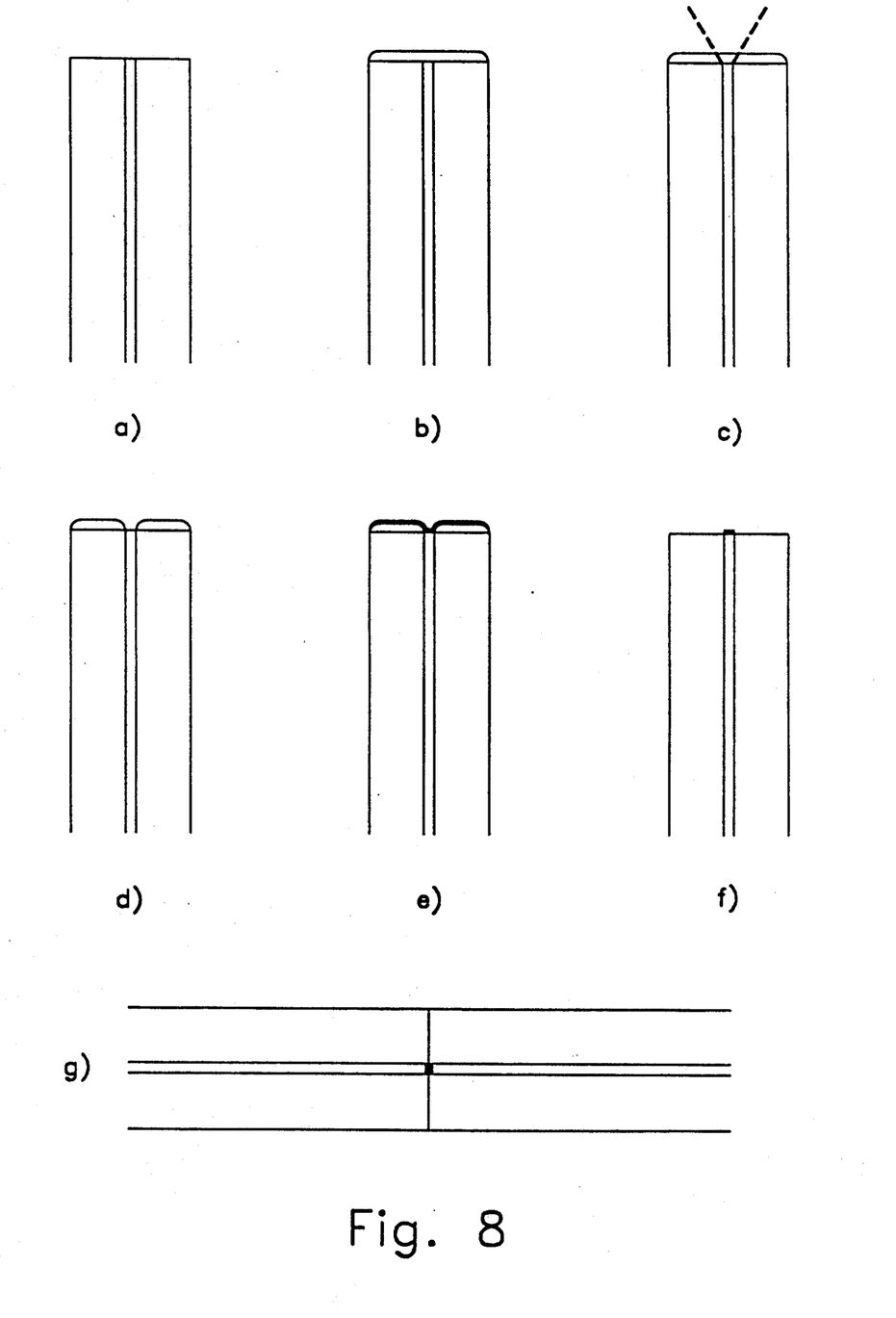

A technique using a positive photoresist material is shown in FIG. 8, wherein a thin layer of photoresist material is first applied to the endface of a cleaved fiber as shown in FIG. 8b. The core region is exposed by launching light down the fiber thus ensuring only the core region is exposed as shown in FIG. 8c. Alternatively, the core region of the fiber can be exposed from the outside using a mechanical mask to block off unwanted light, or by focusing light onto the core region. The photoresist material is then developed, washing away photoresist material from the core region, leaving the core exposed as shown in FIG. 8d. A reflective metal or dielectric layer is then coated over the entire endface of the fiber 8e. The photoresist material is then dissolved thus lifting the deposited reflective layer from the cladding region. A localised mirror over the core region is then achieved as shown in FIG. 8f.

Another approach is available using negative photoresist material. A bare cleaved fiber is first coated over its entire cross section with the desired reflective coating. A layer of the negative photoresist material is then applied over the coated fiber endface. The photoresist material is then exposed over the core region through a mechanical mask placed over the fiber endface, or by focusing the light directly onto the core region. The photoresist material is then developed leaving only the core region coated with photoresist material. An acid or other etchant is then used to dissolve the reflective coating over the cladding region. The remaining photoresist material is then dissolved leaving a localised mirror over the core region of the fiber endface.

In yet another approach, the photoresist may be applied to a fiber endface coated with a single or multiple layer of dielectric material. In this case, the core can be exposed as described for the positive photoresist technique mentioned above where the wavelength of exposing light is chosen such that the dielectric layer is transmissive and not reflective at that wavelength.

STEREO LITHOGRAPHY

There are various stereo lithography or similar light assisted photodeposition techniques may also provide a means to coat only the core region of the fiber, by placing a cleaved fiber end in the moulding fluid and launching light down the fiber, a solid 'plastic' layer will form over the core region of the fiber. A thin layer of material can thus be coated over the entire end of the fiber. A solvent can then be used to dissolve the solid moulding fluid, lifting the coating off the core region. A mask over the fiber with an aperture in the core region similar to FIG. 8d results. The steps of the photoresist technique can then be used from this point to achieve a localized mirror.

3) LIGHT ASSISTED PHOTODEPOSITION

There are many light assisted photodeposition techniques where light is used as a catalyst to stimulate deposition of a reflective layer over the core of a fiber. Exposing the core region of the fiber with light is accomplished by either launching light down the fiber, or exposing the core region directly from outside the fiber through a mask, or by focusing the light onto the core region.

The FFP sensor 10 is well suited to forming a strain rosette, since it combines the high strain sensitivity of the Michelson interferometer with the single fiber self-referencing property of the polarimeter. Testing has shown that the FFP strain rosette device matches or eventually surpasses the performance of conventional resistive foil electrical strain rosettes.

Figure 9:
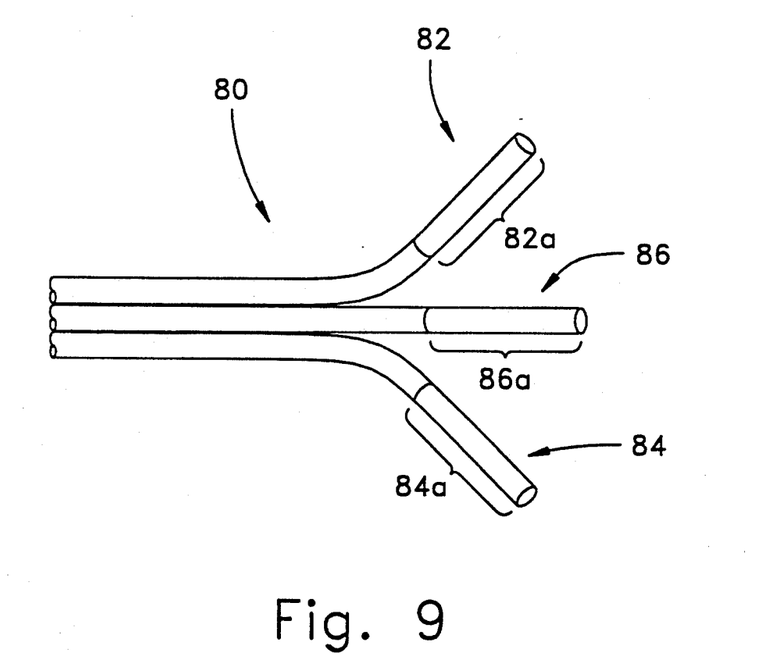
FIG. 9 is a schematic view of a strain rosette making use of the FFP sensor illustrated in FIG. 2.

In one example shown in FIG. 9, a strain rosette 80 was formed with three FFP sensors 82, 84 and 86 arranged in the fashion illustrated in FIG. 9.

By keeping the sensing region 82a, 84a, 86a of each FFP sensor, straight, the standard strain-rosette reduction formulae can be employed to interpret the readings obtained therefrom. Accordingly, as illustrated in FIG. 9, the two outer FFP sensors 82, 84 are curved just before the sensing region. This was be doped by plastically deforming the fibers using the heating arc of a commercially available fusion splicer.

First, the FFP sensor was mounted in one of the vacuum chucks of the splicer so that the electrodes were centered a few fiber diameters past the semireflective splice. An arc was applied to heat the fiber and let it 'droop' under its own weight. The fiber is then moved through the chuck approximately one fiber diameter and the heating arc is reapplied. This procedure was repeated until a 30 to 40 degree (arc length of 2 mm approx) curve is produced. The typical double-pass loss was measured for these curves to be approximately 16 dB. The use of high N.A. (numerical aperture) fiber could lower this loss.

Figure 10:
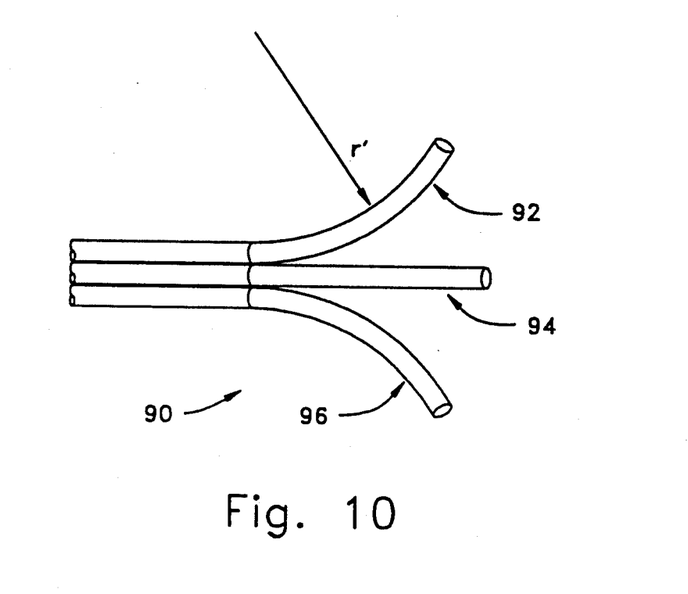
FIG. 10 is a schematic vie of another strain rosette.

While the sensing regions in the arms of the strain rosette 80 are linear, they may equally be configured in a curve as shown for example in FIG. 10. In that figure, a strain rosette 90 has three arms 92, 94 and 96 each of which, as bore is made up of one FFP sensor. In this case, however, the two outside arms 92 and 96 have sensing regions which are curved with a substantially constant radius of curvature.

A particular feature of the rosette 90 is that the sensing region of each FFP sensor has a relatively large radius of curvature which results in relative low light loss through the sensing regions, as opposed to the light loss in the tighter bends of the arms 82, 84 of the rosette 80. In addition, the rosette 90 occupies a smaller area (footprint) than the rosette 80.

Of course, the strain-component reduction formulae will be different for the curved sensing and the linear sensing regions. In addition, the fiber may be heated directly through the splice if desired.

While the figures illustrate a strain rosette with three arms, it will be understood that any reasonable number of arms may be used depending the characteristics of the host structure and the type of analysis being made.

While the above embodiments make use of a mirror that is confined to the first region having a size corresponding to that of the core, the first region (and thus the mirror contained within it) may be smaller or larger than the core depending on the area of light to be reflected. For example, a larger mirror, that is one that extends into the cladding region may be useful in capturing the tail portion of the evanescent field (and hence greater reflectivity).

Figure 11:
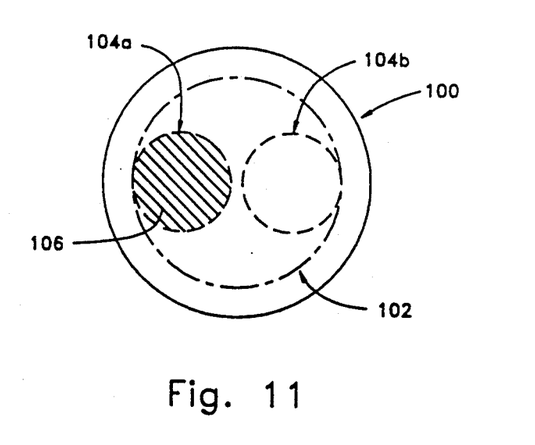
FIG. 11 is a schematic view of a core of a fiber optic element.

Alternatively, a smaller mirror or a number of discrete mirrors may be useful if it is not desirable to capture all of the launched light in the core. The first region may be formed of a number of sectors, each of which is aligned with, and has the geometry of, the spatial modes being carried by the core. One example of this is to produce a modal filter or modal reflector. This can be seen for example in FIG. 11 which illustrates a typical optical fiber core 100 with a number of modes, namely the main gaussian mode 102 and a higher order mode 104a, 104b. By coating the fiber endface with a reflective material in the region of one or more of the higher order modes, light will be permitted to pass along the lowest order gaussian mode while preventing light to pass through the coated higher order mode. Of course, this technique could also be used to prevent light from passing through the lowest order gaussian mode by coating the appropriate region on the fiber endface. Similarly, other higher order spatial modes can be filtered or reflected by choosing appropriately shaped masks which match the geometry of the spatial modes. Similarly, a number of discrete reflecting surfaces can be configured in such a fashion to act as a Fresnel lens or reflector.

Although the above embodiments make use of a single-mode glass fiber, it will be understood that the present technique may be used on other fibers, such as multimode or multi-core fibers, and those made from materials other than glass, including plastic and other transparent material. In addition to its use with high birefringent optical fibers, the present technique may also be used with low birefringent and other generic optical fibers. In addition, while the above technique has been discussed in connection with a low finesse (single reflection) Fabry-Perot sensor 10, the technique may equally be applied to high finesse (multi-refection) applications, such as amplitude modulators, spectral filters and laser diode locking retroreflectors.

However, one should bear in mind that a high finesse cavity is required for these applications. Referring to FIG. 5, a high finesse cavity will have losses that are significantly lower than those of the low finesse equivalent, for example, that is in the order of $L1 < 10\%$ and $R1 > 50\%$.

Figure 12:
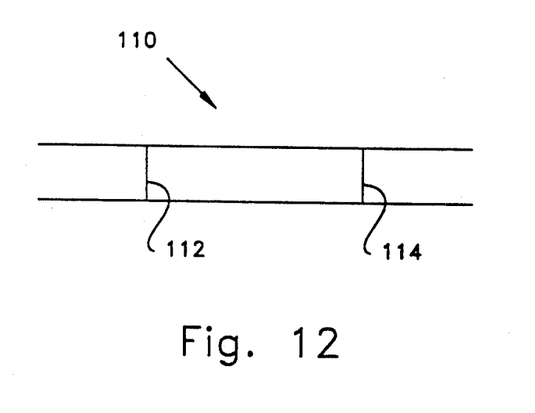
FIG. 12 is a schematic view of a sensor arrangement.

In addition, a high finesse cavity can be formed as shown at 110 in FIG. 12 with a pair semireflective mirrors 112, for use as a transmissive device rather than a reflective device.

Instead of being applied to a fiber with the bow-tie arrangement, the technique to form a localized semireflective splice can also be applied, if desired, to other well known fiber types. For example, applicable fiber types include those with an elliptical core, an elliptical cladding with a circular core, a 'D' type cladding, or other stress lobe type hi-birefringent fibers such as the 'Panda' fiber and the like. This technique is also equally applicable to standard single mode communications fiber and low birefringent fibers.

If desired, a number of semireflective splices may also be used in a series configuration, for use as markers for use in conjunction with OTDR (optical time domain reflectometry).

In addition, a multiplexed FFP sensor system can be realized by using a series of cascaded semireflective splices which reflect light over a narrow wavelength region. A semireflective splice of this type may be formed from a multiple of metallic or dielectric layers in a manner similar to that used in other optical fields.

Figure 13:
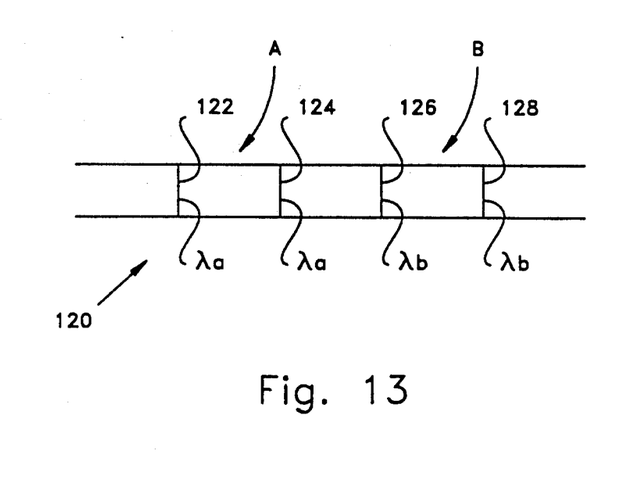
FIG. 13 is a schematic view of another sensor arrangement.

Referring to FIG. 13, a multiplexed FFP sensor arrangement is shown at 120 having a number of semireflective splices shown at 122, to 128. The splices are grouped in pairs and each pair is reflective for a given wavelength $\lambda$. For example, the splices 122, 124 are configured to reflect wavelength band $\lambda a$ while semireflective splices 126, 128 are configured to reflect the same wavelength band $\lambda b$, thus forming two distinct multiplexed FFP sensors.

Figure 14:
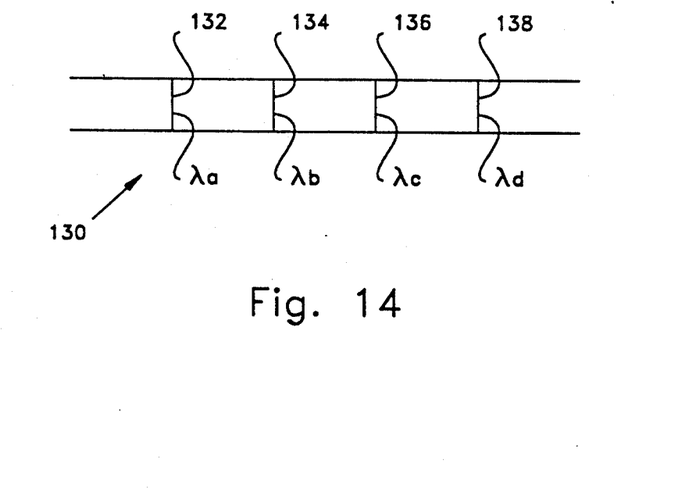
FIG. 14 is a schematic view of yet another sensor arrangement.

Alternatively, each splice may be reflective for a specific wavelength band. FIG. 14 illustrates a multiplexed FFP sensor arrangement 130 having a number of semireflective splices shown as 132, to 138. Each splice is reflective of a given wavelength $\lambda$, namely $\lambda a$, to $\lambda d$ respectively.

Figure 14A:
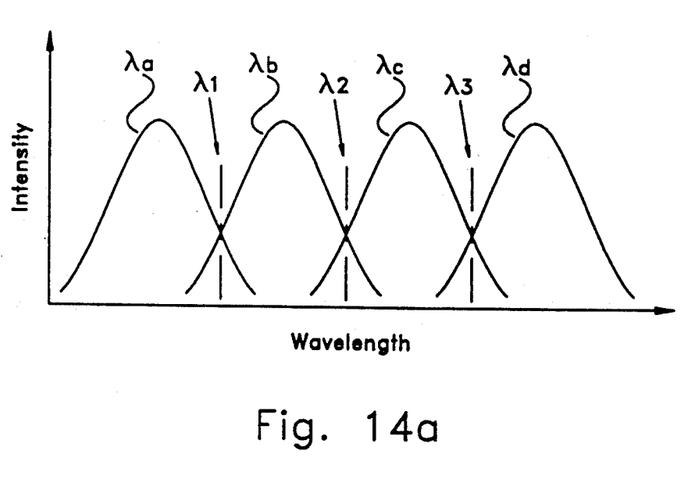
FIG. 14a is a graph depicting wavelength selectivity of a number of components of the sensor arrangement of FIG. 15.

FIG. 14a illustrates a graph of wavelength reflectivities of each semireflective mirror. The reflectivity bands of each mirror overlap with their neighbouring mirror. A wavelength at which any two wavelength bands overlap can be used to permit the corresponding semireflective mirrors to form an FFP sensor. For example, the wavelength at λ1 will enable splices at 132, 134 to be semireflective, while the wavelength at λ2 will enable the splice at 134, 136 to form semireflective mirrors, hence an FFP sensor.

Figure 15:
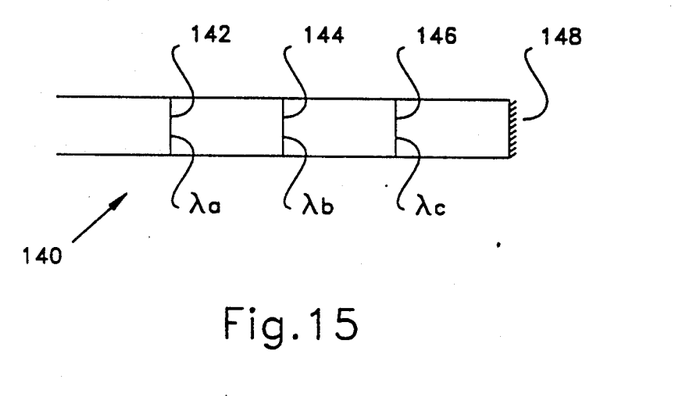
FIG. 15 is a schematic view of yet another sensor arrangement.
Figure 16:
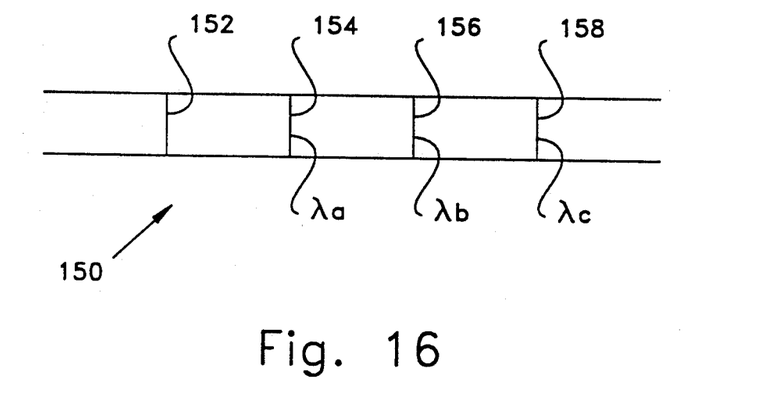
FIG. 16 is a schematic view of yet another sensor arrangement.

Two additional alternative sensor arrangements are also shown in FIGS. 15 and 16. In FIG. 15, an arrangement is shown at 140 having a three semireflective splices 142, 144, 146 upstream of a cleaved endface 148 with fully reflective mirror. In this case, each of the splices 142, 144, 146 is reflective for wavelengths λa, λb and λc respectively. With this arrangement, the three FFP sensors are formed, each having an upstream splice and each terminating at the fully reflective mirror.

In FIG. 16, a sensor arrangement is shown at 150 with four semireflective splices shown at 152, 154, 156 and 158 respectively. The splice 152 is semireflective to a wide band of wavelengths while the splices 154 to 158 are respective to wavelengths λa, λb and λc. In this case, three FFP sensors are formed with each having the splice 152 as the upstream semireflective splice and each terminating at a respective downstream splice.

While the sensor arrangements shown above have a specific number of splices, it will be understood that any number of splices and thus FFP sensors may be provided in series.

While discussion herein above has been restricted to the use of a single localized mirror which is formed by coating only one fiber endface in a semireflective splice, it will of course be understood that both fiber endfaces in the semireflective splice may be coated with a localized mirror prior to fusion splicing if desired.

What is claimed is:

1. An optical fiber device comprising:
   an optical fiber including a core and a peripheral area around said core and integrally formed therewith from dielectric material;
   said fiber having a first portion and a second portion, each of said portions having an end face exposing said core and said peripheral area, said end face having defined thereon a first region adjacent said core and a second region adjacent the peripheral area;
   said first portion having layer of reflective material located on said end face and confined to said first region thereby forming a localized reflector thereon and leaving said peripheral area exposed;
   the end face of said second portion being fusion spliced to the end face of said first portion, wherein the peripheral area of said second portion is fused with the exposed peripheral area of said first portion to form a reflective splice.

2. A device as defined in claim 1 wherein said second portion has another endface, said other endface being coated with a reflective mirror, thereby forming a Fabry-Perot sensor.

3. A device as defined in claim 1 wherein said fiber has a third portion with an end face having a core and a peripheral area around said core, the end face of said third portion being fusion spliced to the other end face of said second portion, wherein the peripheral area of the end face of said third portion is fused with the peripheral area of the other end face of said second portion to form a reflective slice between said second and third portions.

4. A device as defined in claim 1 wherein said first region is equal in area to and aligned with said core.

5. A device as defined in claim 1 wherein said core supports a plurality of spacial modes and said first region has a plurality of sectors each of which is aligned with a corresponding mode, said reflective layer being confined to said sectors.

6. A device as defined in claim 1 wherein said layer of reflective material is formed from a plurality of layers.

7. A device as defined in claim 6 wherein said reflective material includes dielectric material.

8. A device as defined in claim 6 wherein said reflective material is includes metallic material.

9. A device as defined in claim 1 wherein said layer of reflective material is formed from a single layer of material.

10. A device as defined in claim 1 wherein one of said first and second portions is arranged in an arcuate fashion with a radius of curvature.

11. A device as defined in claim 1 wherein said second portion has a layer of reflective material located on said end face and confined to said first region thereby forming a localized reflector thereon and leaving said peripheral area exposed.

12. A device as defined in claim 1 wherein said dielectric material is doped to form said core and said peripheral area.

13. A method of making an optical fiber device comprising the steps of:
   providing a first optical fiber portion and a second optical fiber portion, both of include a core and a peripheral area around said core and formed therewith from dielectric material;
   forming an end face on a said first portion with said core and said peripheral area exposed thereon;
   providing a first region on said end face and adjacent said core and a second region adjacent said peripheral area;
   providing a layer of reflective material on said end face and confining said layer to said first region, thereby to form a localized reflector thereon, while leaving said peripheral area exposed; and
   establishing a fused bond between the peripheral area of the end face of said second portion with the peripheral area of the end face of said first portion to form a reflective splice.

14. A method as defined in claim 13 further including the steps of:
   forming another endface on said second portion,
   coated said other endface with a reflective mirror, thereby forming a Fabry-Perot sensor.

15. A method as defined in claim 13 further including the steps of:
   forming another endface on said second portion with said core and said peripheral area exposed thereon;
   providing a first region on the other end face and adjacent said core and a second region adjacent said peripheral area;
   providing a layer of reflective material on said end face and confining said layer to said first region, thereby to form a localized reflector thereon;
   providing a third optical fiber portion with a core and a peripheral area around said core;
   forming an end face on said third portion with said core and said peripheral area exposed thereon;

fusing the peripheral area of the end face of said third portion with the peripheral area of the other end face of said second portion to form a reflective splice between said second and third portions.

16. A method of making an optical fiber device comprising the steps of:
   providing a first optical fiber portion with a core and a peripheral area around said core;
   forming an end face on said first portion with said core and said peripheral area exposed thereon;
   providing a first region on said end face and adjacent said core and a second region adjacent said peripheral area;
   providing a layer of reflective material on said end face and confining said layer to said first region, thereby to form a localized reflector thereon;
   said step of providing a layer of reflective material further including the steps of:
   positioning a mask element adjacent said end face, said aperture having a size corresponding to said first region; and
   depositing a reflective film through said aperture; and
   establishing a fused bond between the peripheral area of the end face of said second portion with the peripheral area of the end face of said first portion to form a reflective splice.

17. A method of making an optical fiber device comprising the steps of:
   providing a first optical fiber portion with a core and a peripheral area around said core;
   forming an end face on said first portion with said core and said peripheral area exposed thereon;
   providing a first region on said end face and adjacent said core and a second region adjacent said peripheral area;
   providing a layer of reflective material on said end face and confining said layer to said first region, thereby to form a localized reflector thereon;
   said step of providing a layer of reflective material further including the steps of:
   covering said end face with a layer of light sensitive material, wherein a portion of said material is in said first region and another portion is in said second region;
   exposing said first region to light;
   removing the portion of said material from said first region;
   depositing a layer of reflective material on said end face;
   removing said light sensitive material from said end face, whereby that portion of the reflective material in said first region will remain; and
   establishing a fused bond between the peripheral area of the end face of said second portion with the peripheral area of the end face of said first portion to form a reflective splice.

18. A method of making an optical fiber device comprising the steps of:
   providing a first optical fiber portion with a core and a peripheral area around said core;
   forming an end face on said first portion with said core and said peripheral area exposed thereon;
   providing a first region on said end face and adjacent said core and a second region adjacent said peripheral area;
   providing a layer of reflective material on said end face and confining said layer to said first region, thereby to form a localized reflector thereon;
   said reflective layer being provided on said first region by a light assisted photo deposition technique;
   establishing a fused bond between the peripheral area of the end face of said second portion with the peripheral area of the end face of said first portion to form a reflective splice.

19. An optical fiber device comprising:
   an optical fiber including a core and a peripheral area around said core and integrally formed therewith from dielectric material;
   said fiber having a first portion and a second portion, each of said portions having an end face, said end face having defined thereon a first region adjacent the peripheral area;
   said first portion having a layer of reflective material located on said end face and confined to said first region thereby forming a localized reflector thereon and leaving said peripheral area free of said layer of reflective material;
   the end face of said second portion being fusion spliced to the end face of said first portion, in order to establish a bond between the peripheral area of said second portion and the peripheral area of said first portion to form a reflective splice.

20. A device as defined in claim 19 wherein the peripheral areas of both said first and second portions are pristine.

21. A method of making an optical fiber device comprising the steps of:
   providing a first optical fiber portion and a second fiber portion, both of which include a core and a peripheral area around said core and formed therewith from dielectric material;
   forming an end face on a said first portion with said core and said peripheral area exposed thereon;
   providing a first region on said end face and adjacent said core and a second region adjacent said peripheral area;
   providing a layer of reflective material on said end face and confining said layer to said first region, thereby to form a localized reflector thereon, while leaving said peripheral area free of said layer of reflective material; and
   establishing a fused bond between the peripheral area of the end face of said second portion with the peripheral area of the end face of said first portion to form a reflective splice.

22. A method as defined in claim 21 wherein both of said peripheral areas of said first and second portions are pristine prior to the fused bond.

* * * * *